United States Patent [19]

Winter et al.

[11] 4,152,501

[45] May 1, 1979

[54] AVOIDANCE OF VINYL CHLORIDE EMISSIONS IN BATCH SUSPENSION POLYMERIZATIONS

[75] Inventors: Hermann Winter; Karl-Heinz Schönberg; Alfred Lautsch; Jürgen Walther; Rudolf Schleicher, all of Marl, Fed. Rep. of Germany

[73] Assignee: Chemische Werke Huels Aktiengesellschaft, Marl, Fed. Rep. of Germany

[21] Appl. No.: 609,911

[22] Filed: Sep. 3, 1975

[30] Foreign Application Priority Data

Sep. 5, 1974 [DE] Fed. Rep. of Germany ....... 2442574

[51] Int. Cl.² ..................... C08F 2/20; C08F 14/06
[52] U.S. Cl. .................................. 526/88; 526/62; 526/86; 526/344.2
[58] Field of Search ............... 526/71, 74, 88, 344, 526/345

[56] References Cited

U.S. PATENT DOCUMENTS

| 2,754,289 | 7/1956 | Meyer | 526/68 |
| 3,004,013 | 10/1961 | Kircher, Jr. | 526/65 |
| 3,578,649 | 5/1971 | Badguerahanian | 526/68 |
| 3,642,736 | 2/1972 | Downs | 526/68 X |
| 3,678,021 | 7/1972 | Chatelain | 526/344 X |
| 3,787,187 | 1/1974 | DeWitt | 23/285 |

FOREIGN PATENT DOCUMENTS

354581  7/1961  Switzerland ............... 526/344

*Primary Examiner*—C. A. Henderson
*Attorney, Agent, or Firm*—Millen & White

[57] ABSTRACT

The necessity of opening a large polymerization reactor, in order to introduce a polymerization catalyst between charges in the batch suspension of polymerization of vinyl chloride on a commercial scale, is eliminated, thereby avoiding vinyl chloride emissions into the atmosphere, by isolating a segment of a charging conduit for a polymerization reactor containing vinyl chloride under pressure proximate the reactor; partially filling the isolated segment with water; charging the isolated segment above the water therein with a water-insoluble polymerization catalyst; and displacing into the reactor from the catalyst-charged segment first the water therein and then the catalyst therein with vinyl chloride under pressure.

7 Claims, 1 Drawing Figure

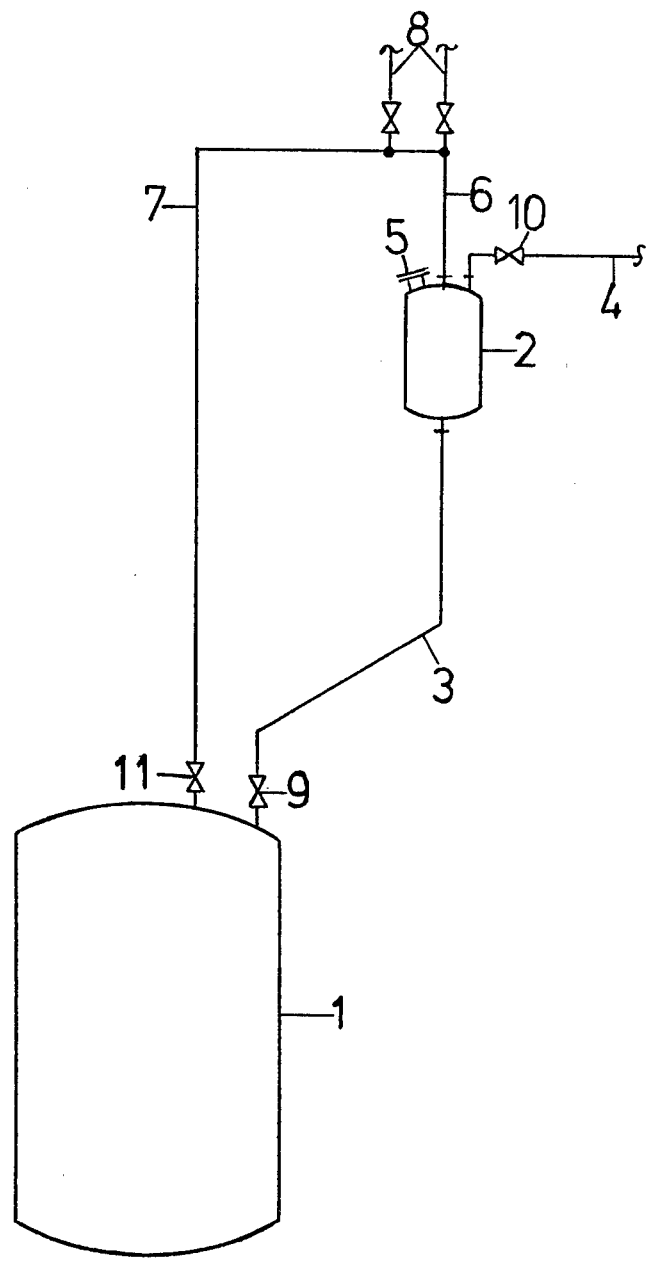

AVOIDANCE OF VINYL CHLORIDE EMISSIONS IN BATCH SUSPENSION POLYMERIZATIONS

BACKGROUND OF THE INVENTION

This invention relates to a process and apparatus for avoiding vinyl chloride emissions in batch suspension polymerizations of vinyl chloride.

The production of polyvinyl chloride by the discontinuous (batch) polymerization of vinyl chloride in an aqueous suspension in the presence of monomer-soluble catalysts and suspension stabilizers is well known.

When conducting these processes on a commercial scale, it has previously been necessary to enter the reactor after the termination of a polymerization operation so that cleaning steps could be carried out. The troublesome wall cakings were then removed by means of pressurized-water appliances and/or scrapers.

The development of automatically operating hydrodynamic cleaning apparatus which are also maintained in pressure connection with the polymerization reactor during the holding times thereof between charges and which can, if necessary, be introduced into the reactor, eliminated the necessity of a manual cleaning step and thus the entrance into the reactor. See Austrian Pat. No. 305,724 whose disclosure is incorporated by reference.

In spite of these more recent technical aids, it has heretofore still been necessary in the suspension polymerization method to open the polymerization reactor after the termination of each polymerization step in order to introduce the polymerization catalyst.

Since oil-soluble catalysts which are not water-soluble are utilized in suspension polymerizations, it is impossible to introduce them into the reactor as an aqueous solution. Attempts to add the catalysts via the vinyl chloride conduit resulted in uncontrollable polymerization and clogging of the conduit.

Consequently, it has been necessary to open the reactor in order to introduce the monomer-soluble catalysts and to feed the catalyst system manually.

The operation of opening a large polymerization reactor requires very time-consuming preparations and subsequent measures. Also, in doing so, considerable vinyl chloride emissions are unavoidable in spite of careful precautionary steps.

The operations necessary for effecting the opening of a polymerization reactor are first, after removing the polymer suspension by pumping, the vinyl chloride is withdrawn by the application of a vacuum; then, a pressure equalization is effected by feeding nitrogen or air. The reactor can thereafter be opened and the catalyst introduced. Subsequently, the polymerization reactor must again be evacuated to remove the nitrogen or air. Only then is it possible to introduce the vinyl chloride for the next polymerization batch.

In the case of a large polymerization reactor now being used and having a capacity of 200 m$^3$, these steps associated with the opening thereof require about 3 hours, which is a significant proportion of the total time necessary for carrying out a polymerization cycle.

However, above all one must consider that the mixture of nitrogen or air and vinyl chloride still present in the reactor after feeding the catalyst must be blown off into the atmosphere, since a separation of the gaseous mixture would be too expensive technically. In this way, for example, up to 100 kg. of monomeric vinyl chloride is emitted into the atmosphere from a reactor having a volume of 200 m$^3$ prior to each polymerization charge.

These disadvantages of the earlier mode of operation are overcome by the process of this invention.

SUMMARY OF THE INVENTION

According to the process of this invention, a monomer-soluble, water insoluble polymerization catalyst for a batch vinyl chloride suspension polymerization is introduced into a reactor containing residual vinyl chloride from a prior batch polymerization without the necessity of opening the reactor, thereby avoiding emission of vinyl chloride into the atmosphere, by isolating a segment of a charging conduit for a polymerization reactor containing vinyl chloride under pressure proximate the reactor; evacuating monomer from the isolated segment; partially filling the evacuated segment with water; charging the isolated segment; above the water therein with a water-insoluble polymerization catalyst; and displacing into the reactor from the catalyst-charged segment first the water therein and then the catalyst therein with vinyl chloride under pressure.

DETAILED DISCUSSION

Emissions of vinyl chloride into the atmosphere from aqueous suspension vinyl chloride batch polymerization in the presence of a monomer-soluble catalyst and conventional suspension stabilizers, in polymerization reactors of large volume capacity, preferably at least 40 m$^3$, is avoided by maintaining the polymerization reactor unopened between polymerizations; between polymerizations cleaning the reactor and evacuating a segment of the vinyl chloride feed line to the reactor containing a charging valve positioned between an upper and a lower shutoff element of residual vinyl chloride; filling the portion of the evacuated feed line between the charging valve and the lower shutoff valve with water or like liquid; feeding the catalyst to the charging valve; and then displacing the catalyst from the charging valve to the reactor with vinyl chloride under pressure. Optionally, the polymerization reactor is cleaned in a conventional manner by a fully automatic hydrodynamic process between the polymerization operations. Suitably, any cavities behind the sealing surface of the shutoff element, for example, those occurring in normal ball cocks and slide valves, are placed under the effect of compressed water, the pressure of which is higher than the highest pressure in the polymerization reactor and in the vinyl chloride feed line while charging vinyl chloride to the reactor. The pressurization of this water is realized by connection to a purge water feed line, which is a normal installation in the batch polymerization of vinyl choride in reactors of large volume capacity.

In a preferred embodiment of the process, the polymerizations are carried out under conditions which avoid cakings on the wall, thereby rendering unnecessary reactor clean-up between polymerizations.

It could not be predicted that the introduction of the catalyst by way of a charging valve within the vinyl chloride conduit could be accomplished successfully on a large technical scale without problems. Rather, it would be expected that even if the space between the charging valve and the shutoff element could be isolated during the introduction of the catalyst into the charging valve, uncontrollable polymerization phenomena would be triggered during the introduction of the vinyl chloride into the polymerization reactor, due to the presence of the concentrated solution of the catalyst in the vinyl chloride formed during its passage through the charging valve and the shutoff element, with the result that polyvinyl chloride cakings and finally clogging would occur in the conduit section below the charging valve and primarily in the lower shutoff element.

DRAWINGS

The process will be described with reference to the drawing, which shows schematically apparatus for conducting the process comprising a polymerization reactor 1 (with conventional charging, discharging venting, mixture and cleaning equipment not shown) a charging valve 2 in communication therewith via a reactor feed conduit 3. Vinyl chloride is introduced into polymerization reactor 1 through a vinyl choride charging conduit 4, charging valve 2 and then reactor feed conduit 3. Charging valve 2 is equipped at its top with an opening 5 formed by a pipe connection capped with a (sealable) quick action stop member fitting. A conduit 6, emanating from the top of charging valve 2, has fitted thereto, in addition to a pressure equalizing conduit 7 providing communication to the top of reactor 1 and fitted with shutoff element 11, further gas and liquid conduits 8 for rinsing, evacuation, etc. A lower shutoff element 9 and an upper shutoff element 10 permits isolation of charging valve 2 from the parts of the equipment containing vinyl chloride, namely reactor 1 and conduit 4, so that catalysts and other additives can be charged into charging valve 2 through opening 5.

In carrying out the process of this invention, employing the apparatus illustrated in the drawing and with shutoff element 10 in vinyl chloride feed line 4 closed, after removal of the polymerizate from a prior batch suspension polymerization from reactor 1 by a discharge conduit (not shown) and after cleaning the reactor if required with automatic cleaning apparatus according to Austrian Pat. No. 305,724, shutoff elements 9, 10 and 11 remain closed and conduit 3 is filled with water via one of conduits 8 and through charging valve 2, fitting 5 is opened and charging valve 2 is charged with the appropriate amount of catalyst solution. After sealing fitting 5 the installation is ready for the next feeding operation. This operation runs as follows: shutoff element 10 is opened and then shutoff element 9 is opened, thereby flushing the latter with water as it is being opened and separating the vinyl chloride-catalyst mixture therefrom until fully opened. After the required amount of vinyl chloride has been charged to the reactor, shutoff element 10 is closed and shutoff element 11 is opened for a small time, thus enabling conduit 3 and charging valve 2 to be emptied of any liquid vinyl chloride hold up. Then shutoff elements 9 and 11 are closed and reactor 1 brought to reaction temperature by direct or indirect heating. Conduit 3 and charging valve 2 are evacuated of vinyl chloride through one of conduits 8 and are thus ready for the next catalyst charging operation.

Water is preferably employed as the blocking (shutoff) fluid. However, contemplated equivalents are other inert liquids which are more dense than liquid vinyl chloride and the catalyst solution, are immiscible with vinyl chloride, in which the catalyst is insoluble and which do not interfere with the polymerization.

A shutoff element 9 having a cavity behind the seal, such as, for example, slide valves and ball cocks of conventional construction, i.e., having a so-called dead space, must be pressurized with water in the cavity. During an opening and closing (catalyst charging) operation, the blocking fluid thus flows into pipeline 3 and thus prevents the entrance of catalyst and vinyl chloride into the cavity behind the seal of shutoff element 9. The feed line for the blocking water must be dimensioned so that the pressure of the water serving as the blocking fluid in the cavities is, even during opening and closing, higher than the pressure in the conduit 3, thereby preventing catalyst and vinyl chloride from entering the cavities and effecting polymerization at those locations.

It was found that even when using shutoff elements without a cavity behind the seal, i.e., for example ball cocks without a dead space, that polymerization at undesired locations, such as hollow spaces, shoulders, corners is avoided with certainty only by providing above the shutoff element a sufficient volume of water to block vinyl chloride from entering shutoff element 9 before the catalyst is introduced into the charging valve. This means that the height and/or length of the water column must be such as to ensure that the step of opening of shutoff element 9 is completed while water still flows therethrough and before the catalyst-vinyl chloride mixture begins to pass therethrough.

During the suspension polymerization of vinyl chloride, wall cakings are usually formed so that after each batch a cleaning step must be conducted. To avoid the necessity of opening the polymerization reactor between batches to do so, automatically operating hydrodynamic cleaning devices are employed, as they are described, for example, in Austrian Pat. No. 305,724, whose disclosure is incorporated by reference. Such hydrodynamic cleaning devices remain in fitted pressure connection with the reactor even during the holding times. For example, they can be arranged above the reflux condenser and introduced into the polymerization reactor while being used through a well provided in the reflux condenser.

However, it is especially advantageous to employ means by which wall cakings are practically entirely avoided. Such steps are described, for example, in U.S. application Ser. No. 547,608, filed Feb. 6, 1975, now U.S. Pat. No. 3,966,695, whose disclosure is incorporated by reference. They involve the use of polymerization reactors whose inner wall surfaces and installations and coolers within the reactor are formed of nickel. By the use of such measures, cleaning costs are considerably reduced.

Suitable pressure reactors for conducting the polymerizations of this invention have large volumes, e.g., at least 40 m$^3$, preferably at least 100 m$^3$, especially about 200 m$^3$. Preferred ranges are 100–250 m$^3$, especially 100–200 m$^3$. The pressure reactors (polymerization kettles) generally have a conventional reactor shape employed for large scale polymerizations. Due to their size, the agitator element is usually driven from the bottom of the reactor. Suitably, the polymerization reactor contains a reflux condenser, because with reactors of the sizes employed in the processes of this invention, the cooling through the reactor wall is generally insufficient to remove the heat of polymerization rapidly enough when the polymerization rate is conducted at a reasonable rate. Therefore, the heating of the polymerization charge is suitably effected by direct feeding of steam, as described in German Unexamined Laid-Open Application DOS No. 2,257,025.

The polymerization is generally conducted at a temperature of 40° to 70° C., depending on the desired K-value. The polymerization pressure is, depending on temperature, about 6–12 atmospheres gauge.

The weight ratio of water to vinyl chloride usually is from 1 : 1 to 2 : 1.

The polymerization advantageously is conducted so as to form a suspension having a polymer solids content of 30 to 50%.

The polymerization is usually conducted employing 0.1% to 0.9% by weight, preferably 0.15% to 0.50% by weight, of suspension stabilizer, based on the monomer.

The usual suspension stabilizers can be employed, e.g., polyvinyl alcohol and/or partially saponified polyvinyl acetate; cellulose derivatives, such as cellulose ethers and mixed ethers, e.g., methyl-, hydroxyethyl-, hydroxypropyl-, methylhydroxypropyl-, carboxymethylcellulose; styrene-maleic acid anhydride copolymers; polyacrylic acid derivatives; polyvinylpyrrolidone; as well as gelatin.

Suitable catalysts are the conventional free radical catalysts which are not water-soluble and which are soluble in the vinyl chloride monomer. Examples of suitable catalysts are organic peroxides, such as diacetyl, acetylbenzoyl, dibenzoyl, dilauroyl, 2,4-dichlorobenzoyl peroxide; peresters, such as tert.-propyl peracetate, tert.-butyl peracetate, tert.-butyl peroctoate, tert.-butyl perneodecanoate, tert.-butyl perpivalate; dialkyl peroxydicarbonates, such as diisopropyl, diethylhexyl, dicyclohexyl, diethylcyclohexyl, dicetyl, ditert.-butylcyclohexyl peroxydicarbonate; azo compounds, such as azobisisobutyronitrile, azobisdimethylvalerodinitrile; and mixed anhydrides of organic sulfoperacids and carboxylic acids, such as, for example, acetylcyclohexylsulfonyl peroxide.

The catalysts can basically be introduced into the charging valve while dissolved in stabilizers, such as, for example, toluene, or in the solid phase.

A single catalyst can be used or a mixture of catalysts, with the customary amounts being employed, e.g., 0.01–3% by weight, preferably 0.01–0.3% by weight, based on the monomer.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLE 1

A 200 m$^3$ polymerization reactor under excess vinyl chloride pressure of 2 atmospheres is charged through a conduit (not shown) by means of pumps (not shown) with an aqueous solution of 0.2 tons of suspension stabilizers and 100 tons of deionized water. The conduit section 3 between the slide valve shutoff element 9 and charging valve 2 is filled with water and into charging valve 2, which has a capacity of 100 liters and which is free of vinyl chloride, is charged, as catalyst through charging valve opening 5, 55 kg dicetyl peroxydicarbonate. After closing charging valve opening 5 and with shutoff elements 8 and 11 closed, first shutoff element 10 leading to charging valve 2 and then shutoff element 9 leading to polymerization reactor 1 are opened, and the polymerization reactor is charged with 60 tons vinyl chloride. The pressure in the vinyl chloride feed line 3 is 11 atmospheres gauge. The water pressure resting on the cavity of the shutoff element 9 is 16 atmospheres gauge, the normal pressure of the water purge feed line.

After the metered feeding of vinyl chloride has been completed, shutoff element 10 is closed; then slide valve 11 in pressure equalizing line 7 is opened for a short time; and then shutoff element 9 to the polymerization reactor is closed. The polymerization reactor is brought to the polymerization temperature (55° C.) by direct heating with steam charged to reactor 1 by means not shown. Charging valve 2 is evacuated and then brought to ambient pressure with nitrogen or air. The charging valve is then ready for charging with catalyst for the next polymerization batch.

When the polymerization in polymerization reactor 2 is terminated and the pressure has dropped to about 4 atmospheres gauge, the polymer suspension is removed by pumping means not shown. The empty polymerization reactor, which has a residual vinyl chloride excess pressure of about 1–2 atmospheres gauge, is then subjected to a closed cleaning operation, if required. The cleaning water is preferably conducted to a separate degasification column, collected and reused.

EXAMPLE 2

(Comparative Example)

A 200 m$^3$ polymerization reactor is charged, with the manhole on the reactor itself (not shown) open, with the same amounts of auxiliary suspension agent, dissolved in water, and with fully deionized water by means of pumps and a conduit (not shown). By way of the manhole the same catalyst system is introduced into the polymerization reactor. Then, the polymerization reactor is closed and a leakage test is conducted with 3 atmospheres gauge of nitrogen. This takes 40 minutes. In another 40 minutes, an expansion and an evacuation to 150 torr [mm. Hg] are carried out, and the vinyl chloride is charged in the same metered amount into the polymerization reactor, and the entire content of the polymerization reactor is brought to the desired polymerization temperature by direct heating with steam. After termination of the polymerization, the suspension is discharged by pumping, the polymerization reactor is evacuated within 60 minutes to 100 torr, and the vacuum is equalized with nitrogen within 30 minutes. To free the polymerization reactor completely of vinyl chloride, another 3 atmospheres gauge of nitrogen pressure is applied and an expansion into the atmosphere is conducted. If necessary, the procedure is repeated. At this point, the manhole on the reactor can be opened.

Compared to the process of Example 1, the step of opening of the polymerization reactor requires an additional preparation period of about 170 minutes. Furthermore, at least 100 kg. of monomeric vinyl chloride is discharged into the atmosphere.

The preceding examples can be repeated with similar success by substituting the generally or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process which comprises conducting a plurality of successive large scale vinyl chloride suspension batch polymerizations in a large polymerization reactor to which the vinyl chloride is supplied under pressure from a vinyl chloride supply line, wherein vinyl chloride emissions result between batches from opening the reactor, containing residual vinyl chloride from a prior batch polymerization, in order to charge the reactor with the water insoluble polymerization catalyst for the next batch, the improvement wherein said vinyl chloride emissions are avoided by maintaining the reactor unopened and pressurized with vinyl chloride between polymerizations and charging the reactor with catalyst by the steps of (a) isolating, from the reactor and the source of vinyl chloride under pressure, a segment proximate the reactor of a vinyl charging conduit;

(b) clearing this isolated segment of emissible monomer;

(c) partially filling the isolated segment with water;

(d) charging the isolated segment above the water therein with a water insoluble polymerization catalyst; and (e) after the polymerizate has been discharged from the reactor, displacing into the reactor, with vinyl chloride under pressure, first the water in the catalyst-charged segment and then the catalyst therein.

2. A process according to claim 1 wherein the charging conduit is a vinyl chloride feed line and the isolated segment is isolated from the reactor by a shutoff valve and any cavities behind the sealing surface of the shutoff valve are filled with water at a pressure higher than the pressure in the polymerization reactor and in the vinyl chloride feed line before the segment is isolated therefrom.

3. A process according to claim 1 wherein the polymerization temperature is 40°–70° C. and the polymerization pressure is 6–12 atmospheres gauge.

4. A process according to claim 1 wherein the reactor is cleared of polymerizate between polymerizations without venting residual vinyl chloride therefrom.

5. A process according to claim 1 wherein the reactor has a volume of about 40–250 m$^3$.

6. A process according to claim 1 wherein the polymerization temperature is 40°–70° C. and the polymerization pressure is 6–12 atmospheres gauge, and the reactor is cleared of polymerizate between polymerizations without venting residual vinyl chloride therefrom.

7. A process according to claim 6 wherein the reactor has a volume of about 40–250 m$^3$.

* * * * *